United States Patent [19]

Wieder

[11] 3,812,477

[45] May 21, 1974

[54] METHOD FOR SUPERRESOLUTION IN AN OPTICAL MEMORY

[75] Inventor: Harold Wieder, Saratoga, Calif.

[73] Assignee: International Business Machines Corporation, Armonk, N.Y.

[22] Filed: Apr. 9, 1973

[21] Appl. No.: 349,170

[52] U.S. Cl. ........... 340/173 LM, 346/1, 350/160 R

[51] Int. Cl. ........................................... G11c 13/04

[58] Field of Search ..................... 350/160 R; 346/1; 340/173 LM

[56] References Cited

UNITED STATES PATENTS

| | | | |
|---|---|---|---|
| 3,715,733 | 2/1973 | Feiner | 340/173 LM |
| 3,727,233 | 4/1973 | Kanaya | 346/1 |
| 3,775,757 | 11/1973 | Taylor | 340/173 LS |

*Primary Examiner*—Terrell W. Fears
*Attorney, Agent, or Firm*—Melvyn D. Silver

[57] ABSTRACT

A light beam method for optically resolving information stored in a data storage medium as areas of differing reflectivity by directing light from a laser operating below threshold onto the storage surface for reflection back into the laser cavity, with reflected light from the higher reflectivity area only enabling the laser cavity to exceed threshold and cause lasing of the laser. Such lasing is indicative of the presence of the high reflectivity area. Alternative embodiments utilizing lasers capable of lasing at two frequencies which share a common energy level are shown.

12 Claims, 4 Drawing Figures

PATENTED MAY 21 1974 3,812,477

METHOD FOR SUPERRESOLUTION IN AN OPTICAL MEMORY

FIELD OF THE INVENTION

Methods for reading information stored in an optical memory, particularly utilizing the physical property difference of reflectivity as indicative of stored information.

BACKGROUND OF THE INVENTION

Optical storage of digital information has become a widely discussed method for obtaining a high density memory. In this technique for generating and recovering data, writing is accomplished by locally altering the optical (and other physical) properties of the storage medium with an intensity modulated laser which sweeps the medium, while reading is achieved by scanning the unmodulated laser across the written information at a power level sufficient for detection, but below that which would alter the stored information. The two most promising effects which may be exploited for this purpose are those of (1) thermal reorientation of the domains of a ferromagnetic material and (2) thermal crystallization of an amorphous material. In both processes there is a well defined threshold temperature at which the physical transition occurs, which makes it possible to write a bit of information whose linear dimension in the storage plane is less than the half-power width of the impinging Gaussian beam. However, readout of such information always removes the potential packing advantage which this implies, since even in the limit of a vanishingly narrow bit, the profile produced by the convolution of a scanning Gaussian beam with a $\delta$ - function has a width equal to that of the diffraction limited optical beam.

Thus, an object of this invention is a method of reading data from an optical storage medium, affording a high signal to noise ratio. Another object is to be able to detect the presence of very closely spaced data, even where such spacing is beyond the limitation of resolution by the laws of optical diffraction. Still another object is alternative methods of achieving the data resolution both in conventional and superresolution modes in a simple, economic fashion.

SUMMARY OF THE INVENTION

These and other objects are achieved utilizing the characteristic of differing reflectivity between areas having different information stored therein, as in an amorphous/crystalline semiconductor storage medium. In one embodiment the method involves directing light from a laser operating below threshold, to the storage surface. The laser pumping power is so adjusted that the sum of the generated light plus that reflected back into the laser cavity from the higher reflectivity area of the storage surface is sufficient to cause lasing. The lasing light, being more intense than that from the laser operating below threshold, is detected by standard detecting means and is indicative of the area detected and the information stored therein.

Alternative embodiments utilize a two frequency laser where reflection causes higher gain frequency lasing extinguishing the lower gain frequency lasing, and detecting the frequency as indicative of the area detected.

IN THE FIGURES

Figure 1:
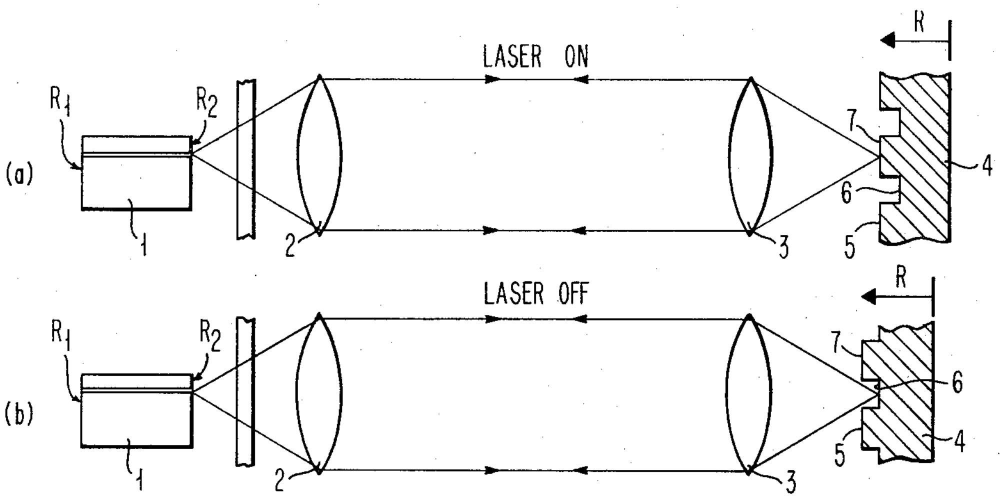

FIG. 1 (*a*) and (*b*) illustrate schematically the physical relationship of the laser to the storage surface.

Figure 2:
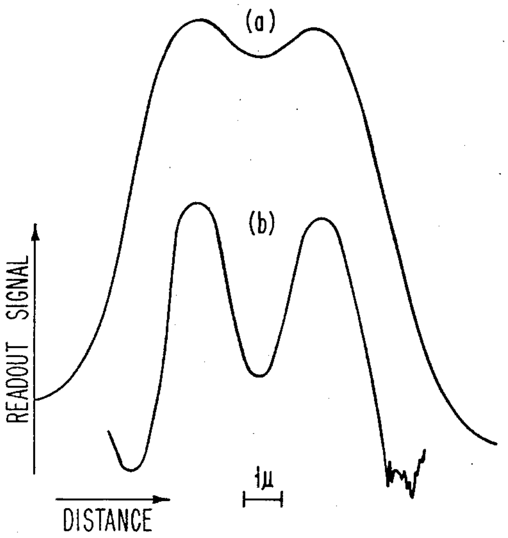

FIG. 2 (*a*) and (*b*) illustrates the resolution capability of this system as a plot of readout signal vs. bit spacing.

Figure 3:
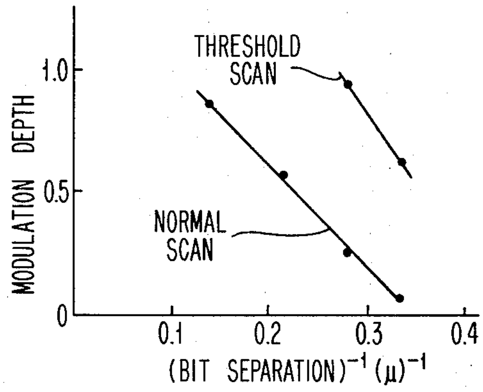

FIG. 3. Modulation depth achieved in scanning across a pair of amorphized spots separated by a crystallized space of variable width in a film of $Te_{.93}Ge_{.02}As_{.05}$, using normal and threshold scanning.

Figure 4:
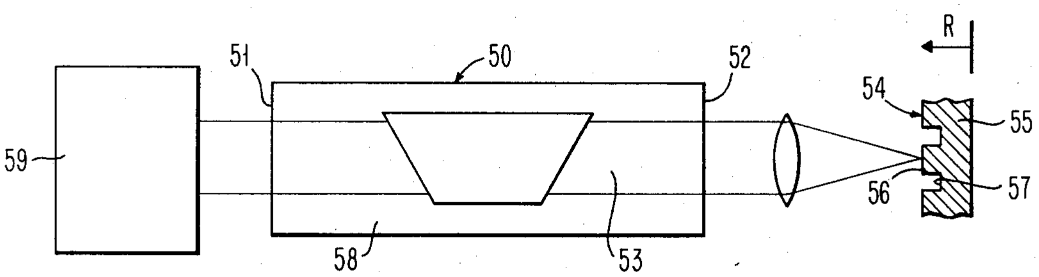

FIG. 4 shows a two frequency laser system otherwise similar to that of FIG. 1.

GENERAL DESCRIPTION

This invention is most easily described in relation to the particular class of materials known as amorphous semiconductors. Feedback from the two binary states of the storage medium is used to affect the power output of a reading laser in a nonlinear way, i.e. to choose such an operating level for the laser that feedback into the cavity from one information state raises the laser above threshold, while feedback from the other state is unable to accomplish the same function. Thus, readout itself becomes a threshold process, and it is then possible to achieve superresolution in the optical memory, i.e., to exceed the diffraction limited performance of a conventional optical system.

The GaAs laser, or other semiconductor laser, has certain natural advantages over other laser systems. The threshold current density of a GaAs laser can be significantly altered by changing the cavity Q, according to the equation $$J_{th}' = (\alpha_o + \alpha_b' + 1/l\ ln\ (R_1R_2)^{-1/2})/J_{th}\ (\alpha_o + \alpha_b + 1/l\ lm\ (R_1)^{-1}) \quad (1)$$

where $R_1$ and $R_2$ are the reflectivities of the cavity faces, $l$ is the cavity length, $\alpha_o$ is the energy-independent loss in the cavity due to free carrier absorption and scattering, while $\alpha_b'$ is the absorption due to band tailing effects. The latter can be written $\alpha_b' = \alpha_b e^{\Delta E/E_o}$, where $E_o$ is the energy level in the conduction band from which a lasing transition first occurs in the absence of feedback and $\Delta E$ is the shift in this level resulting from an improved cavity Q.

In nonsemiconductor laser systems the second term in Equn. (1) is nonexistent, and in applying the technique to such systems, one would be seeking to change only the effective value of $R_2$ by feedback differences from the amorphous and crystalline states of the material. However, $R_2$ is usually large in high Q cavities, while the absolute reflectance difference between the two states of the film is at most 0.20. Thus, even if $R_2$ is initially only 0.80, the feedback would introduce a change $\Delta R_2$ of only 0.01 and 0.02, respectively, which, when translated into a threshold current, via Equn. (1), yields less than a 1 percent difference in lasing threshold effected by the two states. Thus, it is more difficult to utilize a gas laser in the method now described, than as will be shown for a GaAs laser.

A specific example is illustrated using the apparatus of FIG. 1. The low cavity Q and the addition of term 2 in Equn. (1) in the case of the GaAs laser amplifies the effect dramatically. FIG. 1 shows laser 1, specifically a GaAs laser, having faces having reflectivity $R_1$, $R_2$, directed for convenience and to compensate for beam spread, through lenses 2, 3 upon surface 4 schematically illustrated as having bits 5, 6, 7, as areas of differing reflectivity R, bits 5 and 7 having higher reflectivity than bit 6. The laser is a homojunction device operating at 77K and the storage medium is a film of TeGeAs, specifically $Te_{.93}Ge_{.02}As_{.05}$, whose reflectivity varies as shown symbolically by the label R in the figure. In one mode, to allow viewing on a TV screen it was convenient to use additional components not shown but well known in the art. These, in turn, made it necessary to write spots through the film substrate. In this mode of operation, the feedback is reduced by 0.33. An additional loss of 0.67 is suffered by double passage through the rather lossy optics. Thus, the effective $\Delta R_2$ produced by feedback from the crystalline state is 0.04 in this case, compared to a normal value for $R_2$ of 0.33 without feedback. Taking values of $\alpha_o = 13\ cm^{-1}$ and $\alpha_b = 40\ cm^{-1}$ as known in the art and a measured value of 30 $cm^{-1}$ for $1^{-1}$, the expected changed in threshold due to the $\Delta R_2$ introduced by the crystalline material is only 0.03. The measured change in threshold, however, is 0.10, which means that the change in term 2 of Equn. (1), due to the band tailing absorption shift, is the dominant means by which the cavity Q is changed in the GaAs laser at threshold. It is this amplification of the feedback effect which enables a sufficient threshold difference to be realized by feedback from the two states of the material (~5 percent) for the technique to work.

The other advantage of the GaAs laser for this application is that, because of its low Q, it is relatively stable against slight changes in the feedback pathlength and therefore does not require rigid mounting to avoid major instabilities.

The TeGeAs storage medium was prepared in the crystalline state and a reverse mode writing technique was used. The half-power width of the GaAs laser, measured in the storage plane, was 2.5 $\mu$, and the amorphized spots on the film were less than 2.0 $\mu$ wide. Pairs of such amorphized spots were written in which the crystalline spacing was the variable parameter. These bits patterns were then read out with the laser in the normal and the threshold modes of operation. For the normal scan the laser was either below or well above threshold. As the pair spacing is reduced, the modulation depth achieved in a normal scan continues to diminish until a point is reached, as shown in FIG. 2*a*, where even the modest Rayleigh criterion for resolution of two spots is not satisfied. The modulation depth in this case is about 7%. However, the threshold scan yields a 60 percent modulation depth, and the spots are clearly resolved, as shown in FIG. 2*b*. Thus, superresolution is demonstrated for threshold scanning. As shown in FIG. 3, a gain in modulation depth is achieved with the threshold scan for any pair spacing where the normal scan yields a modulation depth less than 100 percent. Depending on the criterion used for determining when bits are resolved, a gain of between 50 percent and 100 percent in the maximum packing density of information has been realized.

As the spacing between amorphized pairs of spots is decreased further, a point is reached where the loss incurred by diffraction from spots which are smaller than the scanning spot reduces the feedback to an unusable level. In the present case this point was reached when the crystalline island was less than 1 $\mu$ wide. However, several improvements in the technique may be made. With coated optics and with the laser incident on the air interface, the threshold difference associated with the two states of the material can be increased to 0.1, or even 0.15. Furthermore, the laser employed above did not have uniform power density over the full junction width, so amorphization did not occur over the full length of the spot. By improving this uniformity or by using only a portion of the imaged junction, one can get clean, well resolved spots. Finally, the use of heterojunction lasers having very narrow active regions provides a somewhat narrower Gaussian beam in the storage plane than was obtained above. Each of these improvements enhances the effect and leads to still higher achievable bit densities. Thus, the method described may be stated in that it is a light beam reading method for optically resolving information stored in a data storage medium as areas of differing reflectivity comprising the steps of (1) directing light from a laser operating below threshold upon the surface containing at least two areas of differing reflectivity, where the laser and the surface are aligned to reflect the impinging light back into the laser, (2) adjusting the pumping power to the laser that the sum of the generated light plus the reflected light from the desired portion of only the higher reflectivity area raises the laser above threshold causing lasing, and (3) detecting the laser output difference associated with the lasing and the non-lasing modes as indicative of the areas detected and the information stored. It is preferable as noted in the earlier discussion, that the laser be a semi-conductor laser, although gas lasers may be used but with much more difficulty. Still preferably, the laser is a GaAs. Inspection of Equn. (1) shows that where one laser cavity face has an absolute reflectance of less than 0.5, a desired range of operating characteristics is present. The reflected light may be directly or indirectly back to the laser cavity, as the physical configuration of the system may require.

It is also well known in the art that the laser and the detecting means may be a single integrated device, such as a PIN diode directly in contact with the laser. The laser, of course, may also be a material such as gallium aluminum arsenide or indium arsenide as well as gallium arsenide.

An important characteristic is that the laser light may be directed upon a surface having at least two areas of common reflectivity separated by an area of differing reflectivity that are spaced apart by a distance less than that resolvable by the laws of optical diffraction. This is a key feature of this invention, and through the superresolution characteristic allows much higher density packing than otherwise achievable in a comparable storage medium. It is also evident that by adjusting the pumping power to the laser, the portion of the high reflectivity area that must be impinged by the light beam for reflection back into the laser cavity to cause lasing can be varied from a small area region, to a high area region where the entire area must be covered, before sufficient energy is fed back into the cavity for lasing to occur. The sensitivity to either the high or low reflectivity region of the system is thus controllable as desired by one skilled in the art for the conditions necessary for the particular operating characteristics desired. It is also clear that while amorphous semi-conductors offer a higher potential as the storage medium, the general principles involved are utilizable in any reflectivity difference memory, such as a metal film having areas eroded therefrom, or a metal film deposited upon a non-reflecting or lower reflecting substrate, and other variations that will be readily evident to those skilled in the art.

This result is also achieved by exploiting a different nonlinear property of certain lasers. Where two competing transitions of widely different energy and gain share a common energy level, the weaker of these transitions can be turned off by raising the Q of the stronger transition above some threshold value. Suitable transition pairs are the 0.63 $\mu$ and 3.39 $\mu$ lines of the HeNe laser and the 0.615 and 1.15 $\mu$ lines of the $Hg^+$ laser. In this case mirror 1 is a wide band, high relectivity mirror, mirror 2 is a narrow band mirror having moderate reflectivity at the visible wavelength and low relectivity at the infrared wavelength, and the memory film completes the cavity for the infrared wavelength. The detector window is made to pass only the visible wavelength. This system is shown in FIG. 5. This system shows laser 50 having mirror 51 of high reflectivity and mirror 52 of a low reflectivity in the infrared wave length and moderate reflectivity in the visible wavelength, so as to pass the light 53 to the surface 54 of the storage medium 55 having areas of high reflectivity 56 and low reflectivity 57 thereon. Where a high reflectivity area 56 is scanned, sufficient reflectivity occurs back into the lasing cavity 58 of laser 50 as to cause high gain frequency lasing, which extinguishes the low gain frequency lasing. A frequency detector 59 may be positioned in proximity to the laser 50 to detect the presence or absence of the high or low frequency as desired, preferably the low frequency, as determinative of the area being scanned. In essence, the system of FIG. 4 is a light beam method for optically resolving information stored in the data storage medium as areas of differeing reflectivity comprising the steps of (1) directing light from a laser capable of lasing in two frequencies which share a common energy level, the lower gain frequency lasing by virtue of the selective reflectivity of one of the laser cavity mirrors, and through that mirror to the surface having areas of differing reflectivity, the laser and the surface aligned to reflect the impinging light back into the laser, and (2) adjusting the pumping level of the laser so that the reflectivity from a desired portion of only the higher reflectivity area of the surface raises the higher gain lasing frequency to a lasing level, extinguishing the lower gain frequency, and (3) detecting the laser frequency as indicative of the areas detected and the information stored. It is preferable to use a HeNe or a $Hg^+$ gas laser. As noted above, have widely differing lines that are most useful. Further, the reflectivity of the mirror should be chosen to have a higher reflectivity for the lower gain frequency than the higher gain frequency. The detecting means preferably detects low gain frequency which is the continuing on position in a preferred embodiment. The laser beam is preferably focused onto the storage surface. Superresolution is also achievable as in the prior case by directing the laser light upon a surface having at least two areas of common reflectivity separated by an area of different reflectivity and spaced apart by a distance less than that resolvable by the laws of optical diffraction. Thus, in this respect this system is identical to the prior system using the gallium arsenide laser in that both utilize a threshold system to obtain reading and superresolution of a storage medium, by utilizing the property of differing reflectivity as a function of the information stored in that system. Again, other storage systems such as metal on a nonreflecting background, etc., as noted previously, may be utilized.

Detecting means for both the presence or absence of intensity in one system or frequency in the other, are well known in the art. In both systems, the pumping level may be adjusted as desired so that either a portion of the entire area which will then constitute the whole portion of the higher reflecting area may be utilized to cause the lasing action in one case or the higher frequency lasing in the other.

Those skilled in the art will be aware of other embodiments using other lasers, and other surface storage materials may be utilized within the scope and teachings of this invention.

What is claimed is:

1. A light beam method for optically resolving information stored in a data storage medium as areas of differing reflectivity comprising the steps of:

directing light from a laser operating below threshold upon a surface containing at least two areas of differing reflectivity, the laser and the surface aligned to reflect the impinging light back into the laser;

adjusting the pumping power to the laser that the sum of the generated light plus reflected light from a desired portion of only the higher reflectivity area raises the laser above threshold causing lasing; and detecting the laser output difference associated with the lasing and nonlasing modes as indicative of the areas detected and the information stored.

2. The method of claim 1 wherein the laser is a semiconductor laser.

3. The method of claim 1 wherein the laser is a GaAs laser.

4. The method of claim 1 wherein the laser has one cavity face with an absolute reflectance of less than 0.5.

5. The method of claim 1 wherein the laser and the detecting means are a single integrated device.

6. The method of claim 1 wherein the laser light is directed upon a surface having at least two areas of common reflectivity separated by an area of different reflectivity and spaced apart by a distance less than that resolvable by the laws of optical diffraction.

7. A light beam method for optically resolving information stored in a data storage medium as areas of differing reflectivity comprising the steps of:

directing light from a laser capable of lasing at two frequencies which have a common energy level, the lower gain frequency lasing by virtue of the selective reflectivity of one of the laser cavity mirrors and through that mirror to the surface having areas of differing reflectivity, the laser and the surface aligned to reflect the impinging light back into the laser;

adjusting the pumping level of the laser that the reflectivity from a desired portion of only the higher reflectivity area of the surface raises the higher gain lasing frequency to a lasing level, extinguishing the lower gain frequency; and detecting the lasing frequency as indicative of the areas detected and the information stored.

8. The method of claim 7 wherein the laser is chosen from either a He-Ne or a $Hg^+$ gas laser.

9. The method of claim 7 wherein the reflectivity of the mirror has a higher reflectivity for the lower gain frequency than the higher gain frequency.

10. The method of claim 7 wherein detecting the lasing frequency comprises detecting the lower gain frequency.

11. The method of claim 7 including focusing the laser beam onto the surface having areas of differing reflectivity.

12. The method of claim 7 wherein the laser light is directed upon a surface having at least two areas of common reflectivity separated by an area of different reflectivity and spaced apart by a distance less than that resolvable by the laws of optical diffraction.

* * * * *